United States Patent [19]

Hickle

[11] 4,101,098
[45] Jul. 18, 1978

[54] STRAIN ACTUATED HYDRAULIC HOLDBACK BAR

[75] Inventor: William H. Hickle, China Lake, Calif.

[73] Assignee: The United States of America as represented by the Secretary of the Navy, Washington, D.C.

[21] Appl. No.: 833,414

[22] Filed: Sep. 15, 1977

[51] Int. Cl.² ............................. B64F 1/06; B64F 1/12
[52] U.S. Cl. ........................................ 244/63; 403/31
[58] Field of Search .................... 244/63, 115; 403/15, 403/31, 41, 360; 285/316, 321; 92/25, 27; 60/547, 583, 591

[56] References Cited

U.S. PATENT DOCUMENTS

| | | | |
|---|---|---|---|
| 2,432,508 | 12/1947 | Cotton | 244/63 |
| 2,444,919 | 7/1948 | Cotton et al. | 244/63 |
| 2,449,554 | 9/1948 | Helber et al. | 244/63 X |
| 2,727,291 | 12/1955 | Hamblin | 244/63 X |
| 2,728,538 | 12/1955 | Mazis | 244/63 |
| 2,777,650 | 1/1957 | Fosness et al. | 244/63 |
| 2,783,004 | 2/1957 | Fieux | 244/63 |
| 3,062,485 | 11/1962 | Hartel | 244/63 |
| 3,370,811 | 2/1968 | Boody | 244/63 |
| 3,437,291 | 4/1969 | Bochman | 244/63 |
| 3,578,273 | 5/1971 | Mulgrave | 244/115 |
| 3,602,461 | 8/1971 | Cody et al. | 244/63 |
| 3,738,693 | 6/1973 | Loustalet | 403/15 X |
| 3,813,065 | 5/1974 | Hallesy et al. | 244/115 |
| 3,945,235 | 3/1976 | Oxlade et al. | 403/15 X |

Primary Examiner—Barry L. Kelmachter
Attorney, Agent, or Firm—R. S. Sciascia; Roy Miller; Thomas W. Hennen

[57] ABSTRACT

A holdback bar for temporarily restraining an aircraft against the combined forces of engine thrust and catapult force prior to a catapult assisted launch of the aircraft which utilizes strain of a mechanical component to measure the level of combined forces. Housing stretch beyond a pre-determined amount actuates a floating trigger rod to lift a valve from its seat and permit escape of hydraulic fluid from a pressure chamber. The holdback bar includes a compensator for absorbing fluid volume changes caused by thermal expansion or contraction of the hydraulic fluid, and a rupture disk for limiting the pressure obtainable within the hydraulic fluid pressure chamber.

8 Claims, 2 Drawing Figures

STRAIN ACTUATED HYDRAULIC HOLDBACK BAR

BACKGROUND OF THE INVENTION

1. Field of the Invention

This invention pertains to repeatable release holdback bars and more particularly to mechanically actuated hydraulic holdback bars.

2. Description of the Prior Art

Aircraft operating from aircraft carrier decks or other short take-off surfaces usually require catapult assistance in order to reach minimum flying speed. A holdback bar is required to restrain the aircraft against increasing catapult forces and engine thrust prior to take-off. The bar must restrain the aircraft until a predetermined combined force is present and then release the aircraft cleanly and rapidly to enable smooth acceleration to flying speed.

Prior holdback bars have included, for example, tensile failure links which part upon reaching the predetermined force, and which must be replaced for each launch. Expended tensile links create a clutter hazard to personnel and may be ingested through jet engine intake ducts on aircraft awaiting take-off. Other holdback bars are typified by U.S. Pat. No. 3,813,065 to Harold W. Hallesy et al. dated May 28, 1974, and U.S. Pat. No. 3,578,273 to Thomas Mulgrave, dated May 11, 1971.

The Mulgrave patent discloses a hydraulic holdback bar which compresses hydraulic fluid within a pressure chamber. Upon reaching a pre-determined pressure, the fluid moves a spring biased ball off its seat and flows into a receiving chamber. This transfer of fluid permits relative movement between a plunger and housing triggering release of the aircraft. The spring loaded ball release valve operates as a pressure regulator and only permits fluid to flow from the pressure chamber at a pre-determined pressure. The Hallesy et al. patent discloses a holdback bar which utilizes a one piece split, chamfered locking ring as a locking member between other load carrying members. Application of pre-determined loads to the load carrying members releases the locking ring from its locking condition by flexure of the ring. Mechanical devices generally are subject to changes in calibrated release force caused by changes in frictional resistance of the various mechanical parts. A mechanical holdback bar therefore is difficult to calibrate and may not retain its calibrated release point after a few uses.

SUMMARY OF THE INVENTION

The strain actuated hydraulic holdback bar of this invention utilizes a hollow resilient trail bar joining the hydraulic portion of the bar with a deck fitting which is held by hooks attached to the take-off surface. This trail bar is attached to a plunger which operates within a housing to compress a hydraulic fluid in response to the combined load. A linearly actuated valve controls flow of the fluid from the pressure chamber, and this valve is controlled by a triggering rod which extends through the hollow trail bar and has an adjustment nut attached at a location spaced from the trail bar surface. After a pre-determined amount of trail bar stretch occurs because of the combined forces, the triggering rod operates the valve to release fluid from the pressure chamber. A rupture disk provides a maximum limit to the pressure obtainable within the pressure chamber, and a compensator chamber absorbs fluid volume changes in the hydraulic fluid.

BRIEF DESCRIPTION OF THE DRAWINGS

Further advantages of the present invention will emerge from a description which follows of the preferred embodiment of a strain actuated hydraulic holdback bar according to the invention, given with reference to the accompanying drawing figures, in which.

DESCRIPTION OF THE PREFERRED EMBODIMENT

Figure 1:
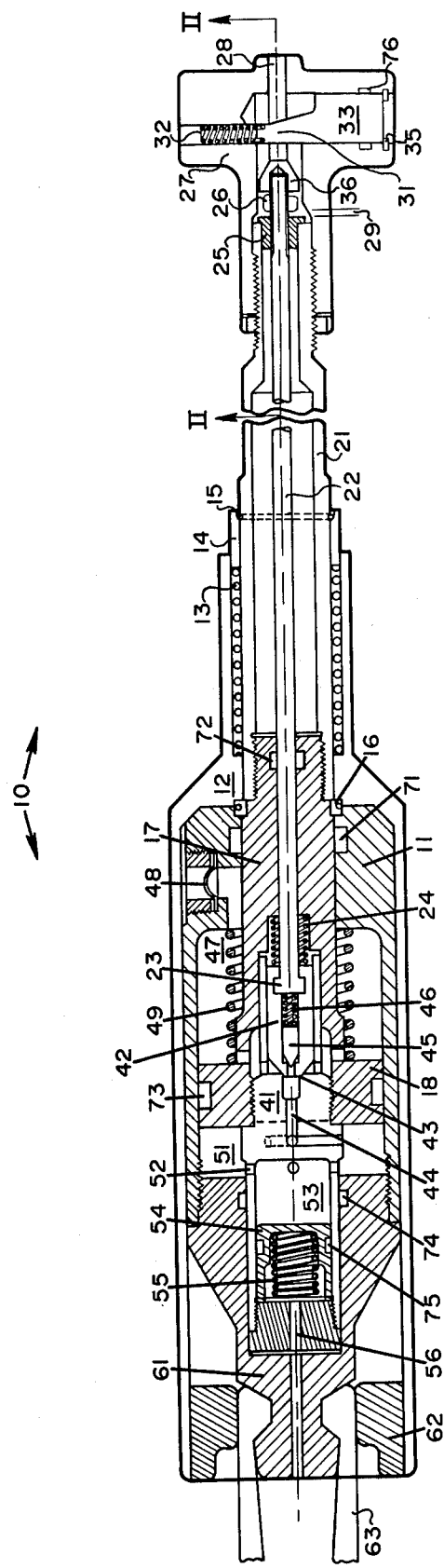
FIG. 1 illustrates a sectional side view taken along the longitudinal axis of a strain actuated hydraulic holdback bar according to the invention.
Figure 2:
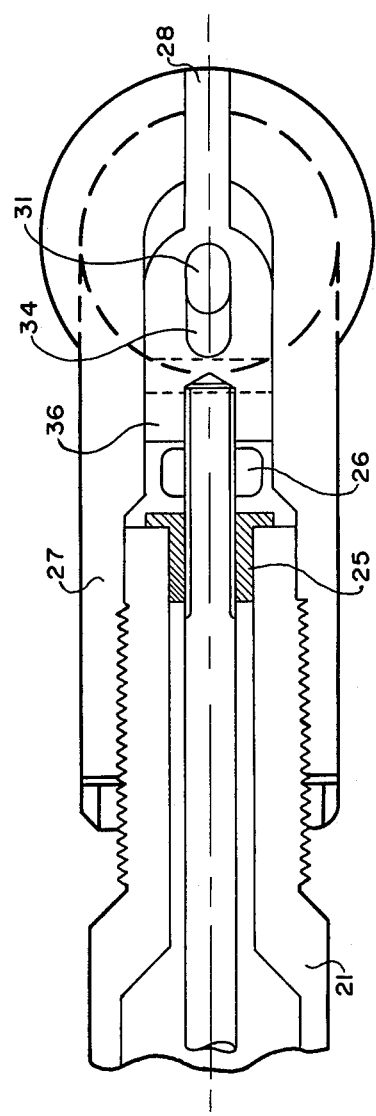
FIG. 2 illustrates a sectional view taken along line II—II in FIG. 1.

Referring now to the drawing wherein like reference numerals correspond to like parts and elements throughout the several views there is shown in FIG. 1 a holdback bar according to the invention generally designated by reference numeral 10. Holdback bar 10 has housing 11 which is closed on one end by main body 61. Plunger 17 having head 18 slides inside of housing 11 and defines pressure chamber 47 and receiving chamber 51. Plunger 17 is attached to hollow resilient trail bar 21 by a threaded connection or other equivalent attachment means.

Outer slide 12 carrying collet ring 62 is moveable longitudinally relative to plunger 17 and is resiliently biased against load ring 16 by spring 13 which is retained by collar 14 and snap ring 15. Seal 71 prevents leakage of hydraulic fluid from pressure chamber 47 between housing 11 and plunger 17. Head 18 is similarly sealed against housing 11 by seal 73. Pressure chamber 47 is protected against excessive pressure buildup by rupture disk 48 which releases fluid from pressure chamber 47 when the hydrostatic pressure exceeds a pre-determined amount, releasing the aircraft in a similar manner to a normal strain caused release. Return spring 49 operates against head 18 and housing 11 to restore the device to its initial position.

Flow of hydraulic fluid within pressure chamber 47 is controlled by a valve having body 41 and head 42 which is resiliently closed against valve seat 43 by valve spring 24. Valve head 42 also contains check valve 45 which is resiliently closed by check valve spring 46.

Triggering rod 22 engages valve head 42 mechanically, as by expanded head 23, or any other equivalent means. Triggering rod 22 extends the length of trail bar 21 and passes through bushing 25, threadedly engages and penetrates adjustment nut 26, and threadedly engages and terminates within manual release extention 36. Deck fitting 27 attaches to trail bar 21 by means of threads, or any other equivalent fastening means. Manual release extension 36 includes reset indicator 28 which indicates whether or not an unloaded holdback bar 10 has been reset and is available for use.

Deck fitting 27 contains release plunger 33 and release spring 32. Release plunger 33 has inclined ramp 31 which engages elongated hole 34 in manual release extension 36. Release plunger 33 is retained by snap ring 35 and may be sealed to prevent escape of lubricant by seal 76.

When valve head 42 is raised from seat 43, hydraulic fluid within pressure chamber 47 passes through damping orifice 44 and then enters receiving chamber 51. Fluid flowing into receiving chamber 51 further passes through compensator orifices 52 to compensator chamber 53 where fluid force causes compensator piston 54 to compress compensator spring 55, thus absorbing fluid volume changes in the pressurized fluid. Compensator piston 54 may include seal 75 to prevent leakage of hydraulic fluid from holdback bar 10. Vent 56 prevents trapped air or fluid under piston 54 from interferring with action of spring 55. Valve body 41 is sealed against main body 61 by seal 74 at one point of sliding contact to prevent loss of hydraulic fluid.

In operation, holdback bar 10 is attached to an aircraft which is to be launched by manually sliding outer slide 12 toward deck fitting 27 until collet ring 62 exposes the coupling grooves on main body 61. Aircraft launch hooks 63 are then coupled to main body 61 and outer slide 12 permitted to return to its initial locked position holding aircraft hooks 63 in engagement with main body 61. The aircraft then taxis along the take-off surface to the catapult shuttle. As trail bar 21 drags along the take-off surface, deck fitting 27 engages two hooks which are part of the take-off surface and then prevents further forward motion of the aircraft. The catapult shuttle is then attached to the aircraft and catapult force applied. The aircraft engines are brought to full take-off power and the catapult shuttle exerts an increasing force on the aircraft until the combined force reaches a pre-determined amount. As the combined forces on the aircraft increase, the pressure within pressure chamber 47 increases. At the same time, the stress within trail bar 21 increases, and trail bar 21 elongates according to known stress-strain relationships. When trail bar 21 has elongated a pre-determined amount, adjustment nut 26 contacts bushing 25, clearance 29 having been eliminated by trail bar 21 elongation. Adjustment nut 26 contacting bushing 25 applies tensile force to triggering rod 22, causing rod 22 to lift head 42 from seat 43, and thus permit escape of pressurized hydraulic fluid from pressure chamber 47 through damping orifice 44 into receiving chamber 51. As fluid escapes pressure chamber 47, plunger 17 moves relative to housing 11 and load ring 16, which is attached to plunger 17, forces outer slide 12 to move aft relative to main body 61. When plunger 17 and housing 11 have moved a short distance, on the order of 1.1 inches relative to each other, main body 61 extends beyond collet ring 62 and aircraft hooks 63 may then disengage main body 61 rapidly and cleanly.

After the aircraft has been released and begins its take-off run, return spring 49 restores plunger 17 and housing 11 to their initial positions relative to one another. Fluid transferred to receiving chamber 51 now transfers back to pressure chamber 47 by forcing check valve 45 open and flowing from damping orifice 44 through check valve 45 and into pressure chamber 47. Valve head 42 is designed so that the net force resulting from fluid pressure on all exterior surfaces is approximately zero so that triggering rod 22 need only overcome the force of valve spring 24.

Holdback bar 10 may easily be adjusted to accomodate a variety of aircraft simply by adjusting the initial position of adjustment nut 26 relative to bushing 25 while the device is unloaded. Once adjustment nut 26 is properly adjusted for a given load, and deck fitting 27 re-installed, the adjustment is inaccessable and not subject to tampering by deck personnel.

Rupture disk 48 may advantageously be selected to provide for a 25% overload over the design pressure for a given calibration. Failure of rupture disk 48 causes holdback bar 10 to immediately release the aircraft.

Reset indicator 28 is flush with the end of deck fitting 27 when valve head 42 is properly seated, indicating that the device is ready for use. Reset indicator 28 extends beyond deck fitting 27 to visually indicate when holdback bar 10 is not ready for use.

Obviously many modifications and variations of the present invention are possible in the light of the above teachings. It is therefore to be understood that within the scope of the appended claims the invention may be practiced otherwise than as specifically described.

What is claimed is:

1. In a hydraulic holdback bar of the type used for temporarily restraining an aircraft against the combined forces of engine thrust and catapult force prior to a catapult assisted launch of said aircraft, wherein said holdback bar has means for attachment to a runway surface and means for releasable attachment to said aircraft, and has a housing and a central plunger operative within said housing to pressurize a fluid in a pressure chamber in response to said combined forces, and has means for venting said fluid from said pressure chamber into a separate receiving chamber in response to a predetermined combined force enabling relative motion between said plunger and housing for triggering release of said aircraft, and has means for returning said fluid from said receiving chamber to said pressure chamber to reset said holdback bar for additional launches, the improvement comprising:

said plunger defining a resilient hollow shank and having a longitudinal axis;

said venting means comprising a valve having a body and a head, said valve body being attached to said plunger and defining a first passageway communicating between said pressure chamber and said receiving chamber, said valve head being movable along said longitudinal axis between open and closed positions, and operative in said closed position with said valve body to close said first passageway, said valve head being resiliently biased toward said closed position;

an elongated triggering rod having first and second ends, said first rod end engaging said valve head and operative to move said valve head from said closed position to said open position in response to tensile force within said rod, and said rod extending within said hollow shank to said second rod end at a location spaced from said valve head; and means for applying tensile force to said triggering rod in reponse to said predetermined combined force.

2. A hydraulic holdback bar as set forth in claim 1 wherein said means for returning said fluid from said receiving chamber to said pressure chamber comprises:

said valve head defining a second passageway communicating between said first passageway and said pressure chamber;

said second passageway containing a resiliently biased fluid pressure activated check valve operative to enable flow through said second passageway from said first passageway to said pressure chamber and to prevent flow through said second passageway from said pressure chamber to said first passageway.

3. A hydraulic holdback bar as set forth in claim 1 wherein said means for applying tensile force comprises:

a collar operatively engaging said triggering rod and axially spaced from said rod first end; and said resilient hollow shank defining a contacting surface spaced a predetermined distance from said collar and operative to contact said collar in response to elongation of said resilient hollow shank caused by said predetermined combined force.

4. A hydraulic holdback bar as set forth in claim 1 including means for manually applying tension to said triggering rod.

5. A hydraulic hold back bar as set forth in claim 1 wherein:

said valve body defines a compensator bore;

a resiliently biased compensator piston sealingly and slidably retained within said compensator bore;

said compensator piston and compensator bore defining a compensator chamber; and said valve body defining at least one orifice for communicating fluid between said receiving chamber and said compensator chamber.

6. A hydraulic holdback bar as set forth in claim 4 wherein said means for manually applying tension comprises:

an extension member having an elongated transverse hole and attached to said second end of said triggering rod;

said resilient hollow shank defining a transverse bore corresponding to said elongated transverse hole; and a resiliently biased piston slidable between first and second positions retained within said transverse bore, and having a ramp-like face operative in said second position to engage said elongated hole and force said extension member axially away from said valve body.

7. A hydraulic holdback bar as set forth in claim 1 wherein said housing comprises a weak zone defining a portion of a wall surrounding said pressure chamber.

8. A hydraulic holdback bar as set forth in claim 7 wherein said weak zone comprises a rupture disk.

* * * * *